United States Patent
Jung et al.

(10) Patent No.: US 8,085,487 B1
(45) Date of Patent: Dec. 27, 2011

(54) BLOCKING FORMATS FOR A DISK DRIVE THAT REDUCE PERFORMANCE

(75) Inventors: Kameron Kam-Wai Jung, Placentia, CA (US); Hwee C. Chia, Trabuco Canyon, CA (US)

(73) Assignee: Western Digital Technologies, Inc., Irvine, CA (US)

(*) Notice: Subject to any disclaimer, the term of this patent is extended or adjusted under 35 U.S.C. 154(b) by 433 days.

(21) Appl. No.: 11/961,725

(22) Filed: Dec. 20, 2007

(51) Int. Cl.
    *G11B 5/02* (2006.01)
(52) U.S. Cl. ............................ 360/48; 360/53
(58) Field of Classification Search ............... 369/44.25, 369/275.3; 360/53, 31, 48
    See application file for complete search history.

(56) References Cited

U.S. PATENT DOCUMENTS

| | | | |
|---|---|---|---|
| 6,130,796 A | 10/2000 | Wiselogel | |
| 6,446,156 B1 | 9/2002 | Chia et al. | |
| 6,493,176 B1* | 12/2002 | Deng et al. | 360/78.05 |
| 6,633,442 B2* | 10/2003 | Quak et al. | 360/31 |
| 6,751,036 B2* | 6/2004 | Quak et al. | 360/48 |
| 6,765,737 B1 | 7/2004 | Lim et al. | |
| 6,943,972 B1* | 9/2005 | Chue et al. | 360/48 |
| 6,956,710 B2* | 10/2005 | Yun et al. | 360/53 |
| 6,957,379 B1* | 10/2005 | Patapoutian et al. | 714/774 |
| 7,012,771 B1 | 3/2006 | Asgari et al. | |
| 7,046,471 B2* | 5/2006 | Meyer et al. | 360/75 |
| 7,110,197 B2 | 9/2006 | Cho | |
| 7,113,358 B2 | 9/2006 | Zayas et al. | |
| 7,145,740 B2 | 12/2006 | Zayas et al. | |
| 7,283,316 B2 | 10/2007 | Chiao et al. | |
| 7,362,529 B2* | 4/2008 | Chiao et al. | 360/48 |
| 2005/0078393 A1* | 4/2005 | Cho | 360/31 |
| 2006/0227445 A1* | 10/2006 | Chiao et al. | 360/31 |

* cited by examiner

*Primary Examiner* — Wayne Young
*Assistant Examiner* — Thomas D Alunkal (57) ABSTRACT

A method is disclosed for selecting a format for a disk surface of a disk drive, the disk drive comprising the disk surface, and a head actuated over the disk surface. A first TPI is selected for the disk surface, and then evaluated to determine whether it is compatible with a first target capacity. If the first TPI is not compatible with the first target capacity, then a second TPI is selected for the disk surface wherein the second TPI is less than the first TPI.

22 Claims, 6 Drawing Sheets

|  | TPI 1 | TPI 2 | TPI 3 | TPI 4 | TPI 5 | TPI 6 |
|---|---|---|---|---|---|---|
| CAPACITY 1 | ALLOW | ALLOW | ALLOW | ALLOW | ALLOW | ALLOW |
| CAPACITY 2 | ALLOW | ALLOW | ALLOW | ALLOW | ALLOW | ALLOW |
| CAPACITY 3 | BLOCK | ALLOW | ALLOW | ALLOW | ALLOW | ALLOW |
| CAPACITY 4 | BLOCK | BLOCK | ALLOW | ALLOW | ALLOW | ALLOW |
| CAPACITY 5 | BLOCK | BLOCK | BLOCK | ALLOW | ALLOW | ALLOW |

FIG. 3A

|  | TPI 1 | TPI 2 | TPI 3 | TPI 4 | TPI 5 | TPI 6 |
|---|---|---|---|---|---|---|
| CAPACITY 1 | ALLOW | ALLOW | ALLOW | ALLOW | ALLOW | ALLOW |
| CAPACITY 2 | ALLOW | ALLOW | ALLOW | ALLOW | ALLOW | ALLOW |
| CAPACITY 3 | BLOCK | ALLOW | ALLOW | ALLOW | ALLOW | ALLOW |
| CAPACITY 4 | BLOCK | BLOCK | ALLOW | ALLOW | ALLOW | ALLOW |
| CAPACITY 5 | BLOCK | BLOCK | BLOCK | ALLOW | ALLOW | ALLOW |

FIG. 3B

|  | TPI 1 | TPI 2 | TPI 3 | TPI 4 | TPI 5 | TPI 6 |
|---|---|---|---|---|---|---|
| CAPACITY 1 | ALLOW | ALLOW | ALLOW | BLOCK | BLOCK | BLOCK |
| CAPACITY 2 | ALLOW | ALLOW | ALLOW | ALLOW | BLOCK | BLOCK |
| CAPACITY 3 | BLOCK | ALLOW | ALLOW | ALLOW | ALLOW | BLOCK |
| CAPACITY 4 | BLOCK | BLOCK | ALLOW | ALLOW | ALLOW | ALLOW |
| CAPACITY 5 | BLOCK | BLOCK | BLOCK | ALLOW | ALLOW | ALLOW |

FIG. 3C

|  | TPI 1 | TPI 2 | TPI 3 | TPI 4 | TPI 5 | TPI 6 |
|---|---|---|---|---|---|---|
| CAPACITY 1 | ALLOW | ALLOW | ALLOW | BLOCK | BLOCK | BLOCK |
| CAPACITY 2 | ALLOW | ALLOW | ALLOW | ALLOW | BLOCK | BLOCK |
| CAPACITY 3 | BLOCK | ALLOW | ALLOW | ALLOW | ALLOW | BLOCK |
| CAPACITY 4 | BLOCK | BLOCK | ALLOW | ALLOW | ALLOW | ALLOW |
| CAPACITY 5 | BLOCK | BLOCK | BLOCK | ALLOW | ALLOW | ALLOW |

BLOCKING FORMATS FOR A DISK DRIVE THAT REDUCE PERFORMANCE

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3).

Figure 1:
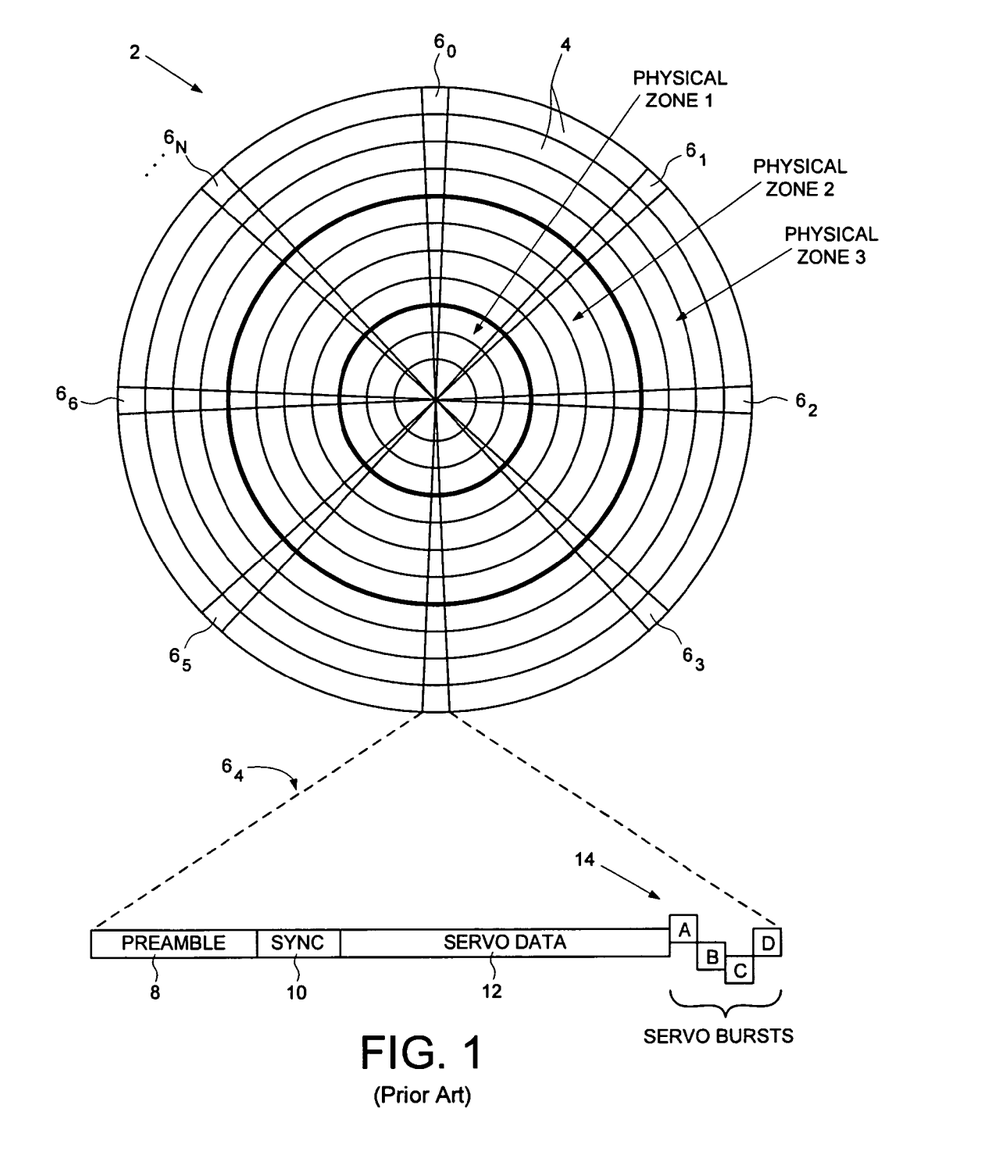
FIG. 1 shows a prior art disk format comprising a plurality of data tracks defined by a plurality of servo sectors.

The prior art disk format of FIG. 1 also comprises a number of servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

DETAILED DESCRIPTION OF EMBODIMENTS OF THE INVENTION

Figure 2A:
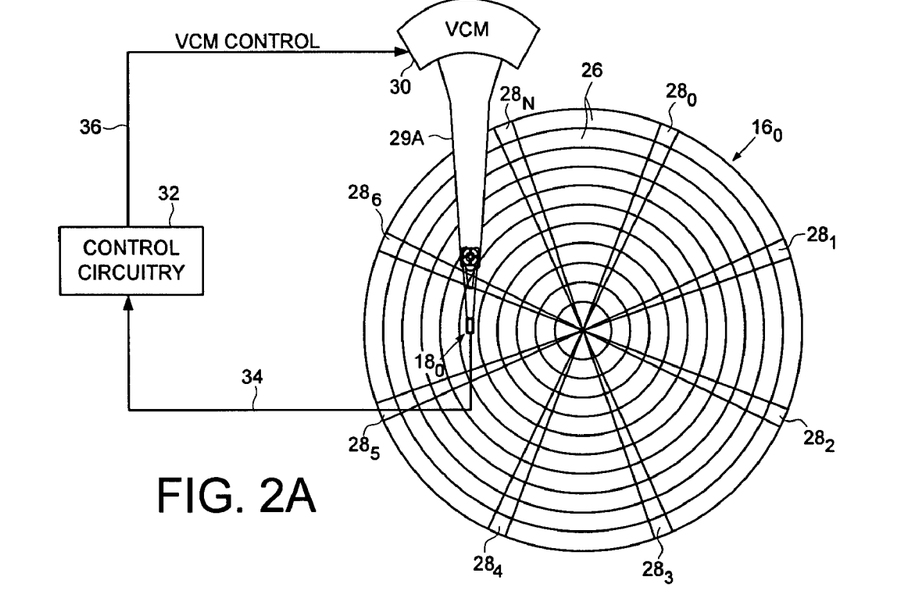
FIG. 2A shows a disk drive according to an embodiment of the present invention comprising a head actuated over the disk, and control circuitry.
Figure 2B:
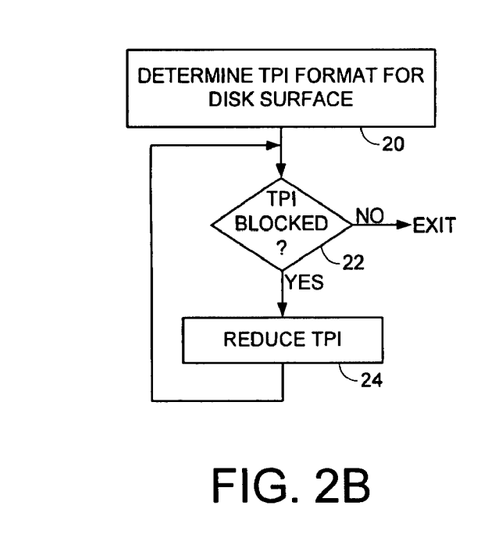
FIG. 2B is a flow diagram according to an embodiment of the present invention wherein if a selected TPI for a disk surface is not compatible with a target capacity, then the selected TPI is reduced.

FIG. 2A shows a disk drive according to an embodiment of the present invention comprising a disk surface $16_0$, and a head $18_0$ actuated over the disk surface $16_0$. FIG. 2B is a flow diagram according to an embodiment of the present invention for selecting a tracks per inch (TPI) for the disk surface $16_0$ by selecting a first TPI for the disk surface $16_0$ (step 20), and determining whether the first TPI is compatible with a first target capacity. If the first TPI is not compatible with the first target capacity (step 22), then a second TPI is selected for the disk surface $16_0$ wherein the second TPI is less than the first TPI (step 24).

In one embodiment, the radial density of the data tracks 26 is selected relative to the servo tracks per inch when writing servo sectors $28_0$-$28_N$ to the disk surface $16_0$. That is, the width of the servo tracks and corresponding width of the data tracks are defined by the width of the servo sectors $28_0$-$28_N$ when written to the disk surface $16_0$. The servo sectors $28_0$-$28_N$ may be written to the disk using any suitable technique, such as with an external servo writer or media writer, or self-servo written by the disk drive. In one embodiment, seed tracks are written to the disk surface $16_0$ (e.g., spiral seed tracks) which are processed in order to write the servo sectors $28_0$-$28_N$ to the disk surface $16_0$.

In an alternative embodiment, the data tracks per inch is selected after writing the servo sectors $28_0$-$28_N$ to the disk surface $16_0$. The centerline of each data track is determined relative to a suitable offset from the servo tracks to achieve the desired ratio of data TPI to servo TPI. The corresponding offset is then applied to the servo system in order to maintain the head $18_0$ over a data track centerline during write and read operations.

In the embodiment of FIG. 2A, the head $18_0$ is connected to a distal end of an actuator arm 29A which is rotated about a pivot by a voice coil motor (VCM) 30. Control circuitry 32 within the disk drive processes the read signal 34 emanating from the head $18_0$ in order to demodulate the embedded servo sectors $28_0$-$28_N$ to generate a position error signal (PES) representing the position error of the head $18_0$ relative to a target radial location. The control circuitry 32 filters the PES with a suitable compensation filter to generate a control signal 36 applied to the VCM 30 in order to move the head $18_0$ in a direction that reduces the PES.

Figure 2C:
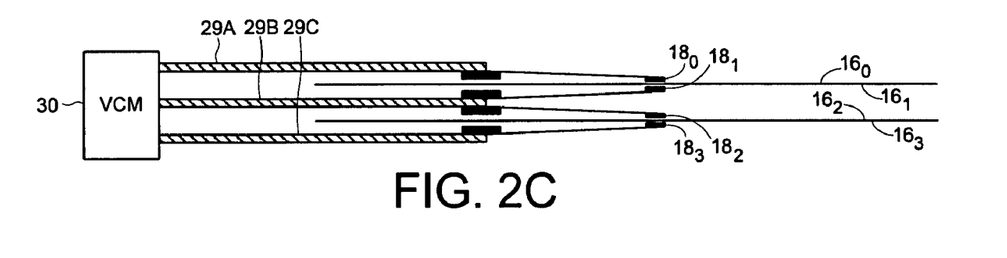
FIG. 2C shows a disk drive according to an embodiment of the present invention comprising two disks and four disk surfaces.

FIG. 2C shows an embodiment of the present invention wherein the disk drive comprises two disks and four disk surfaces $16_0$-$16_3$, where each disk surface is accessed through a respective head $18_0$-$18_3$ actuated by respective actuator arms 29A-29C. The optimal data tracks per inch for each disk surface typically depends on the geometry of the head (e.g., the width of the write element). In one embodiment, a TPI calibration procedure is executed to determine the optimal TPI for each disk surface (which may be executed prior to or after servo writing the disk surface). In one embodiment, the TPI calibration procedure includes writing a test pattern to a target radial location on the disk, measuring an initial bit error rate when reading the test pattern, writing data adjacent to the target radial location at a predetermined offset, re-measuring the bit error rate when reading the test pattern, and adjusting the offset until the difference between the measured bit error rate and the initial bit error rate exceeds a threshold.

After determining an optimal TPI for a disk surface, the TPI is evaluated to determine whether it is compatible with a target capacity for the disk surface. The capacity for a disk surface is related to the radial density (TPI) as well as the linear density (bits per inch or BPI). To achieve a target capacity for a selected TPI, a corresponding BPI is selected for the disk surface. That is, for a given TPI there is a corresponding BPI that will achieve a target capacity for the disk surface. However, for certain TPI and target capacity combinations, the corresponding BPI will be so low that it will reduce the data rate of the disk drive (the data rate is determined by the BPI and the linear velocity of the data track). Therefore, in one embodiment of the present invention certain TPI and target capacity combinations are "blocked" from use. This embodiment is illustrated in the example format table shown in FIG. 3A wherein TPI 1 and CAPACITY 1 correspond to the highest TPI and highest capacity. A number of the entries in the lower left corner of the format table are marked as BLOCK meaning that for the given capacity the corresponding TPI setting is blocked from being used.

Figure 3A:
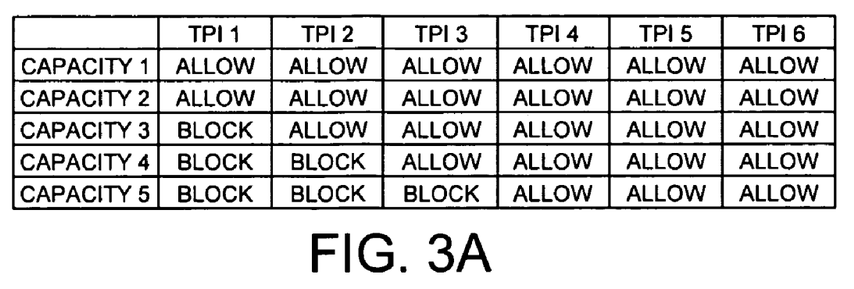
FIG. 3A shows a format table according to an embodiment of the present invention wherein certain higher TPI settings are blocked for certain lower capacity settings to avoid reducing throughput of the disk drive.
Figure 3B:
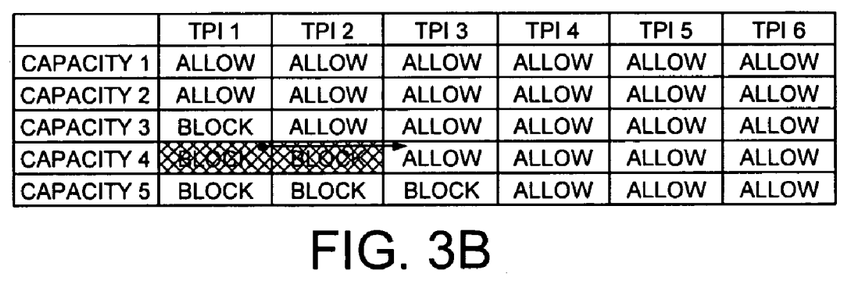
FIG. 3B shows an example of the present invention wherein the selected TPI is reduced until a TPI is found that is compatible with the target capacity.

An example of a blocked TPI format setting is illustrated in FIG. 3B, wherein CAPACITY 4 has been selected for a particular disk surface. After performing the TPI calibration procedure, it is determined that TPI 1 is the optimal TPI setting for the disk surface. However, this entry is blocked in the format table as shown in FIG. 3B, therefore the TPI selected for the disk surface is reduced until a setting is found that is not blocked (TPI 3 in the example of FIG. 3B).

Figure 3C:
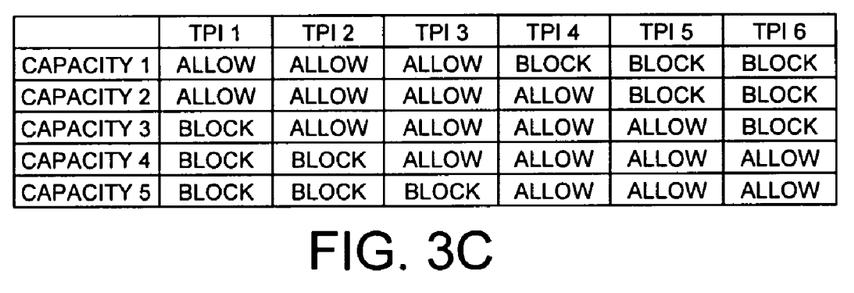
FIG. 3C shows an example of the present invention wherein certain lower TPI settings are blocked for certain higher capacity settings to avoid exceeding the data rate limit of the read channel.

Any suitable TPI setting may be blocked in the format table of FIG. 3A for any suitable reason. For example, in one embodiment certain TPI settings may be blocked at higher target capacities so as not to exceed the data rate capabilities of the control circuitry 32 (e.g., the read channel circuitry). This embodiment is illustrated in FIG. 3C wherein a number of entries in the upper right corner of the format table are marked as BLOCK since the corresponding BPI settings will exceed the data rate capabilities of the control circuitry 32.

Figure 3D:
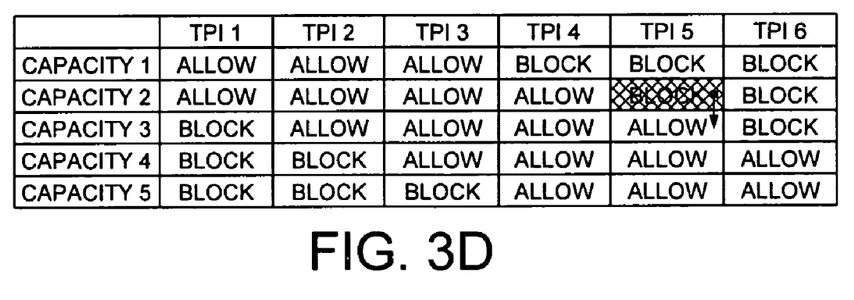
FIG. 3D shows an example of the present invention wherein the selected capacity is reduced if the selected TPI exceeds the data rate limit of the read channel.

An example of a blocked TPI format setting is illustrated in FIG. 3D, wherein CAPACITY 2 has been selected for a particular disk surface. After performing the TPI calibration procedure, it is determined that TPI 5 is the optimal TPI setting for the disk surface. However, this entry is blocked in the format table as shown in FIG. 3D, and since the TPI cannot be reduced (lower TPI settings are also blocked) the target capacity of the disk surface is reduced until a setting is found that is not blocked (CAPACITY 3 in the example of FIG. 3D).

Figure 4:
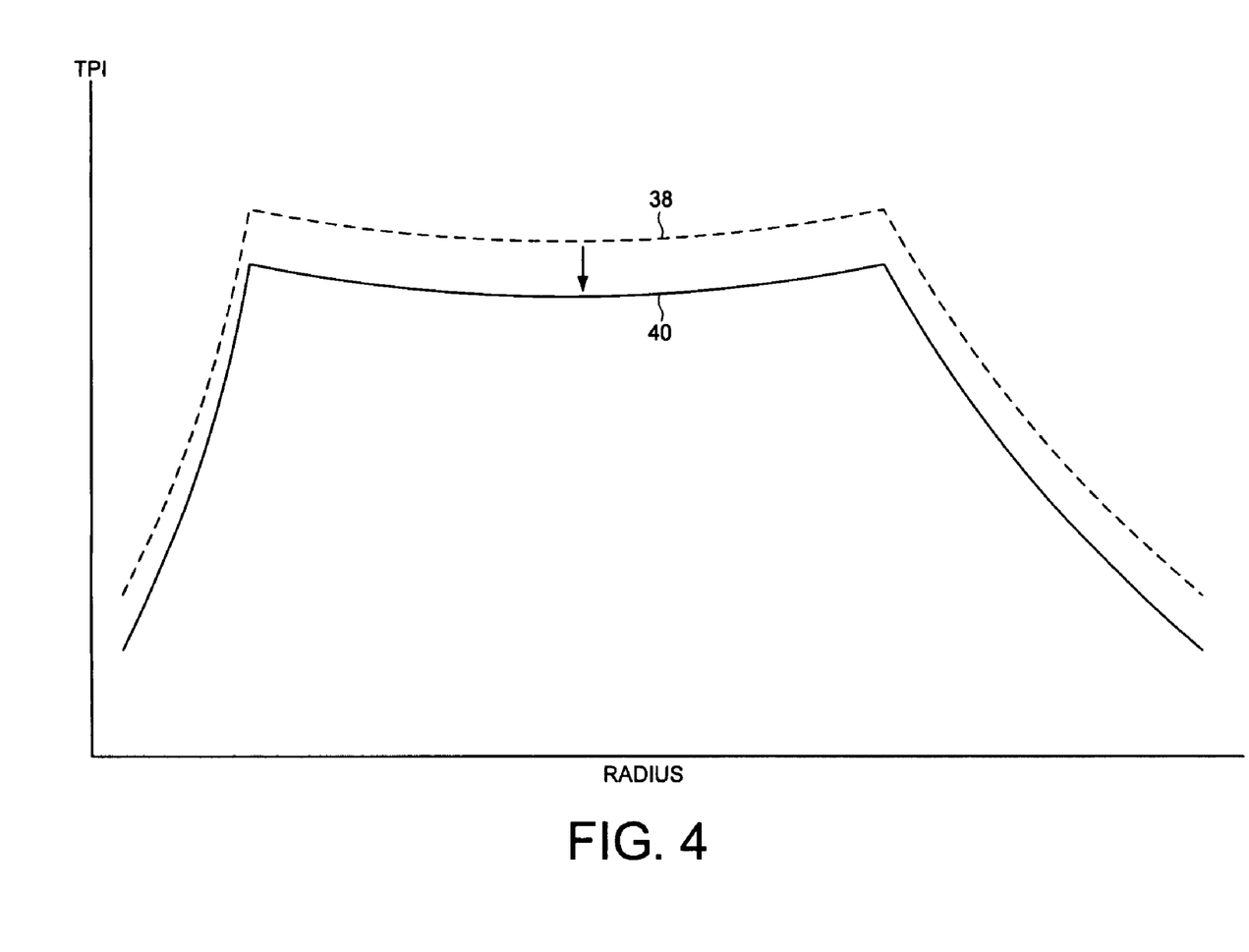
FIG. 4 shows an embodiment of the present invention wherein the control circuitry selects a TPI profile across the radius of the disk surface, and then adjusts the selected TPI by adjusting the TPI profile.

In one embodiment, selecting a TPI for a disk surface comprises selecting a TPI profile across the radius of the disk surface and adjusting the TPI profile. This embodiment is illustrated in FIG. 4 wherein the TPI is varied across the radius of the disk surface, for example, to account for the head skew angle. As the head skew angle increases, the orientation of the head relative to a data track may change requiring a lower TPI setting. Any suitable technique may be employed to generate the TPI profile, such as measuring the geometry of the head and then generating (or looking up) a corresponding TPI profile. If the first TPI profile 38 selected for a disk surface is blocked for a target capacity, then a second (lower) TPI profile 40 is selected for the disk surface as illustrated in FIG. 4.

Figure 5:
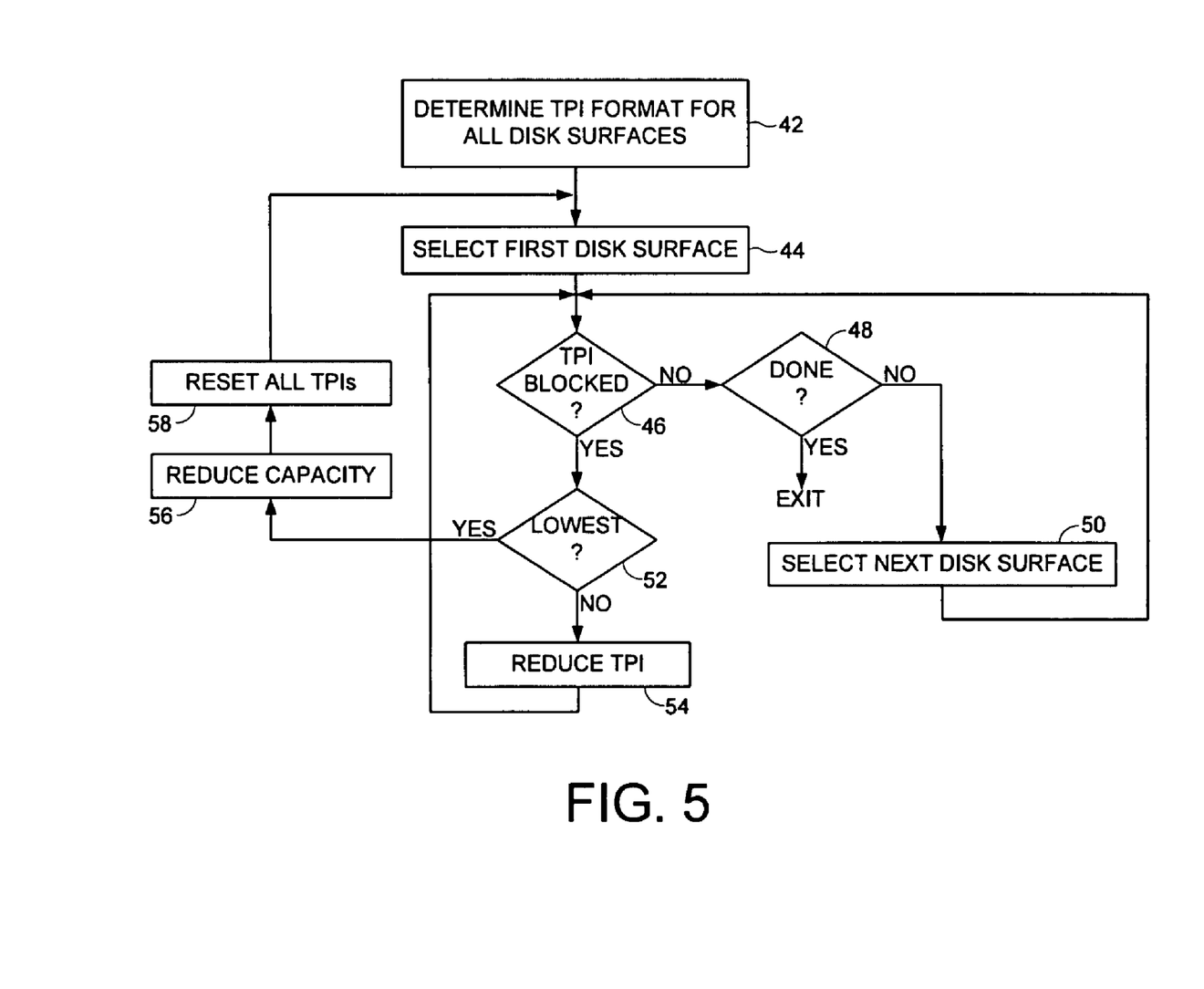
FIG. 5 is a flow diagram according to an embodiment of the present invention wherein if a selected TPI for a particular disk surface is blocked, then the TPI is reselected for all the disk surfaces.

FIG. 5 shows a flow diagram according to an embodiment of the present invention wherein the disk drive comprises a plurality of disk surfaces, and a first TPI is selected for each disk surface (step 42). A first disk surface is selected (step 44) and the respective TPI evaluated relative to the target capacity to see if the selected TPI is blocked (step 46). If the selected TPI is not blocked, and there are more disk surfaces to check (step 48), the next disk surface is selected (step 50) and the respective TPI evaluated (step 46). If the selected TPI is blocked (step 46), and the selected TPI is not the lowest TPI (step 52), then the selected TPI is reduced (step 54) and the process repeats. If the selected TPI is the lowest TPI (step 52), then the target capacity for all of the disk surfaces is reduced (step 56) and the selected TPI for all of the disk surfaces are reset (step 58) to the settings selected initially (step 42), and the flow diagram is re-executed.

In the embodiment of FIG. 5, each disk surface is assigned the same target capacity, and if one disk surface requires a reduction in capacity (step 56), then the capacity is reduced for all of the disk surfaces. In an alternative embodiment, each disk surface is assigned a particular target capacity, and if one of the disk surfaces requires a reduction in capacity, then the capacity is reduced only for that disk surface. In one embodiment, after selecting a suitable TPI and target capacity for each disk surface, the disk drive is assigned to a lot of disk drives having a specified overall capacity.

In one embodiment, the flow diagrams disclosed herein are implemented by the control circuitry 32 within each disk drive during a manufacturing procedure. The control circuitry 32 may comprise any suitable circuitry, such as any suitable integrated circuit or circuits. For example, the control circuitry 32 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 32 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 16 and read into a volatile semiconductor memory when the disk drive is powered on.

Figure 6:
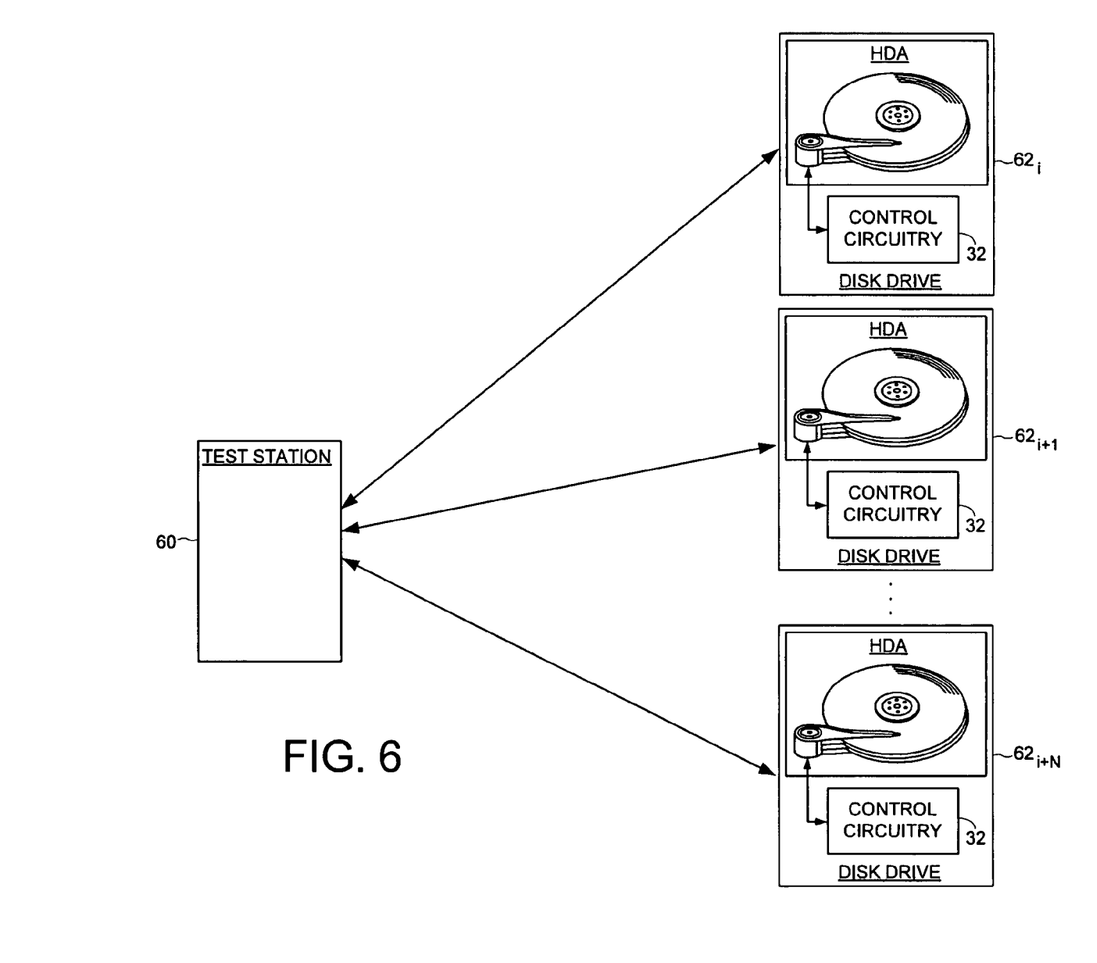
FIG. 6 shows an embodiment of the present invention wherein a manufacturing test station executes at least part of the TPI selection process of the present invention.

In an embodiment shown in FIG. 6, a manufacturing test station 60 downloads the instructions to the control circuitry 32 of a plurality of disk drive $62_{i-i+N}$ which then executes the embodiments of the present invention. In an alternative embodiment, the manufacturing test station 60 may implement at least part of the flow diagrams described herein (e.g., using a microprocessor executing instructions of a control program) by issuing appropriate commands to each disk drive $62_{i-i+N}$, such as read/write commands to determine the optimal TPI for each disk surface. The manufacturing test station 60 may then evaluate the optimal TPI and make appropriate adjustments to the TPI and/or capacity as described above.

What is claimed is:

1. A method of selecting a format for a disk surface of a disk drive, the disk drive comprising the disk surface, and a head actuated over the disk surface, the method comprising:
   writing data to the disk surface;
   reading the data to generate a metric;
   selecting a first tracks per inch (TPI) for the disk surface in response to the metric;
   determining that the first TPI is not compatible with a first target capacity due to a data rate of the disk surface being less than a threshold; and
   selecting a second TPI for the disk surface wherein the second TPI is less than the first TPI.

2. The method as recited in claim 1, further comprising:
   selecting a TPI profile across the radius of the disk surface; and
   adjusting the TPI profile.

3. The method as recited in claim 1, wherein the disk drive comprises a plurality of disk surfaces further comprising:
   selecting a first TPI for each disk surface;
   determining that the first TPI of a respective disk surface is not compatible with the first target capacity due to a data rate of the respective disk surface being less than the threshold; and
   selecting the second TPI for the respective disk surface.

4. The method as recited in claim 1, further comprising:
   selecting a second target capacity less than the first target capacity; and
   selecting the second TPI relative to the second target capacity.

5. The method as recited in claim 1, wherein the disk drive comprises a plurality of disk surfaces, further comprising:
   selecting a second target capacity less than the first target capacity; and
   selecting the second TPI for each disk surface relative to the second target capacity.

6. The method as recited in claim 1, wherein the metric comprises a bit error rate.

7. A method of selecting a format for a disk surface of a disk drive, the disk drive comprising the disk surface, and a head actuated over the disk surface, the method comprising:
   writing data to the disk surface;
   reading the data to generate a metric;
   selecting a first tracks per inch (TPI) for the disk surface in response to the metric;
   determining that the first TPI is not compatible with a first target capacity due to a data rate of the disk surface being less than a threshold; and;
   selecting a second target capacity for the disk surface wherein the second target capacity is less than the first target capacity.

8. The method as recited in claim 7, wherein the disk drive comprises a plurality of disk surfaces further comprising:
   selecting a first TPI for each disk surface;
   determining that the first TPI of a respective disk surface is not compatible with the first target capacity due to a data rate of the respective disk surface being less than the threshold; and
   selecting the second target capacity for the respective disk surface.

9. The method as recited in claim 7, further comprising selecting a second TPI for the disk surface relative to the second target capacity.

10. The method as recited in claim 7, wherein the disk drive comprises a plurality of disk surfaces, further comprising selecting a second TPI for each disk surface relative to the second target capacity.

11. The method as recited in claim 7, wherein the metric comprises a bit error rate.

12. A disk drive comprising:
   a disk surface;
   a head actuated over the disk surface; and
   control circuitry operable to:
      write data to the disk surface;
      read the data to generate a metric;
      select a first tracks per inch (TPI) for the disk surface in response to the metric;
      determine that the first TPI is not compatible with a first target capacity due to a data rate of the disk surface being less than a threshold; and
      select a second TPI for the disk surface wherein the second TPI is less than the first TPI.

13. The disk drive as recited in claim 12, wherein the control circuitry is further operable to:
   select a TPI profile across the radius of the disk surface; and
   adjust the TPI profile.

14. The disk drive as recited in claim 12, wherein the disk drive comprises a plurality of disk surfaces and the control circuitry is further operable to:
   select a first TPI for each disk surface;
   determine that the first TPI of a respective disk surface is not compatible with the first target capacity due to a data rate of the respective disk surface being less than the threshold; and
   select the second TPI for the respective disk surface.

15. The disk drive as recited in claim 12, wherein the control circuitry is further operable to:
   select a second target capacity less than the first target capacity; and
   select the second TPI relative to the second target capacity.

16. The disk drive as recited in claim 12, wherein the disk drive comprises a plurality of disk surfaces and the control circuitry is further operable to:
   select a second target capacity less than the first target capacity; and
   select the second TPI for each disk surface relative to the second target capacity.

17. The disk drive as recited in claim 12, wherein the metric comprises a bit error rate.

18. A disk drive comprising:
   a disk surface;
   a head actuated over the disk surface; and
   control circuitry operable to:
      write data to the disk surface;
      read the data to generate a metric;
      select a first tracks per inch (TPI) for the disk surface in response to the metric;
      determine that the first TPI is not compatible with a first target capacity due to a data rate of the disk surface being less than a threshold; and;
      select a second target capacity for the disk surface wherein the second target capacity is less than the first target capacity.

19. The disk drive as recited in claim 18, wherein the disk drive comprises a plurality of disk surfaces and the control circuitry is further operable to:
   select a first TPI for each disk surface;

determine that the first TPI of a respective disk surface is not compatible with the first target capacity due to a data rate of the respective disk surface being less than the threshold; and select the second target capacity for the respective disk surface.

20. The disk drive as recited in claim 18, wherein the control circuitry is further operable to select a second TPI for the disk surface relative to the second target capacity.

21. The disk drive as recited in claim 18, wherein the disk drive comprises a plurality of disk surfaces and the control circuitry is further operable to select a second TPI for each disk surface relative to the second target capacity.

22. The disk drive as recited in claim 18, wherein the metric comprises a bit error rate.

* * * * *